June 7, 1927.

M. D. KAST

WEEDER

Filed June 29, 1925

WITNESSES
Chr. Nielsen
J. T. Schrott

INVENTOR
Morgan D. Kast,
BY
ATTORNEYS

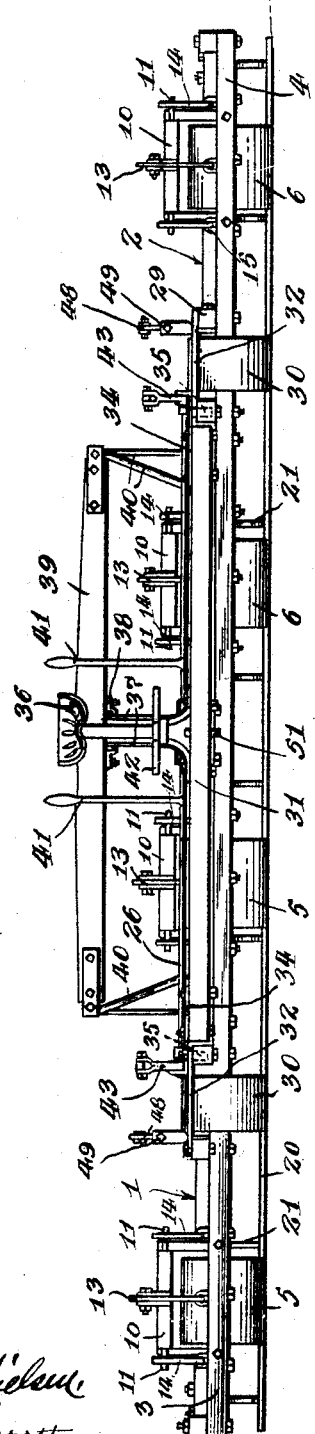
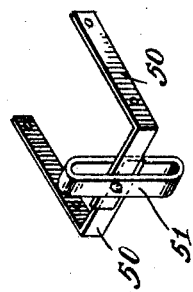

June 7, 1927.

M. D. KAST 1,631,733

WEEDER

Filed June 29, 1925

WITNESSES
Chr. Helem
J. T. Schrott

INVENTOR
Morgan D. Kast,
BY
ATTORNEYS

Patented June 7, 1927.

1,631,733

UNITED STATES PATENT OFFICE.

MORGAN D. KAST, OF PENDLETON, OREGON.

WEEDER.

Application filed June 29, 1925. Serial No. 40,347.

This invention relates to improvements in weeders and it consists of the constructions, combinations and arrangements herein described and claimed.

An object of the invention is to provide an implement for cutting and gathering weeds in newly plowed ground, for example, an important improvement consisting of a beater for striking the back of the gathering blade as it is raised from the ground with its accumulation of weeds.

Another object of the invention lies in the provision of rollers traveling in front of each of a plurality of ground roller frames for the purpose of stablizing the implement.

Another object of the invention is to provide an equalizer extending from frame to frame to keep the frame sections in uniform distance.

Another object of the invention is to make an adjustable provision at the adjusting lever of each ground roller for supporting the weight of the implement to thereby relieve said lever.

A further object of the invention is to provide a retainer between sections to hold the frames in proper longitudinal relationship yet permit necessary vertical movement.

Other objects and advantages appear in the following specification reference being had to the accompanying drawings in which:

Figure 2 is a front elevation,

Figure 3 is an end elevation of the frame section at the right of the observer of Fig. 1, the blade beater being omitted, Figure 4 is an end elevation of the lift frame section. the ground roller supports, etc. being omitted, Figure 5 is a detail perspective view of the frame retainer.

Figure 1:
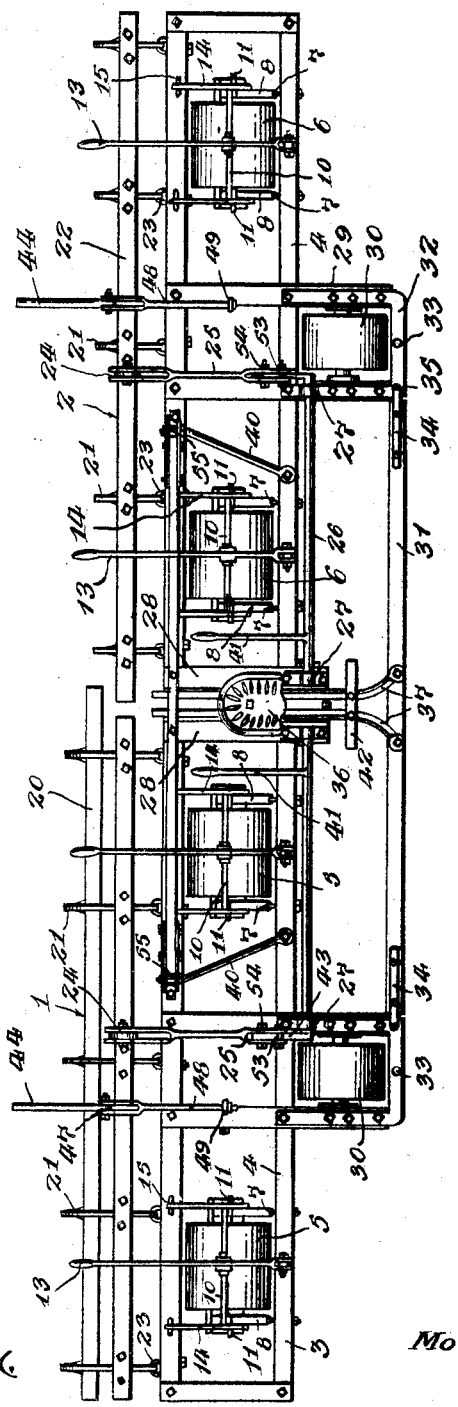
Figure 1 is a plan view of the improved weeder.

In carrying out the invention, provision is made of a plurality of frame sections, in this case two, generally designated 1 and 2 which, more particularly, comprise main frames 3 and 4 carrying pairs of ground rollers 5 and 6. The description of the support of one of the rollers 6 will suffice for all, each being alike.

Eyebolts 7 secured in the front rail of the main or roller frame 4 form the hinge attachments of a pair of angles 8 which carry suitable bearings 9 for the roller. These angles include a cross bar 10 which has pins 11 at the extremities where it joins the angles, and a central arm 12 where it makes pivotal connection with the actuating lever 13.

Arms 14, hingedly connected to the rear rail of the roller frame at eyebolts 15, have series of holes 16 into any one pair of which the pins 11 are insertible to effect a particular adjustment of the roller support. The actuating lever 13 is pivotally mounted at 17 to an upright 18, there being a series of holes 19 to permit any necessary compensation for adjustments at the pins 11. The peculiar arrangement of the roller support constitutes an articulated suspension which transfers the weight of the implement to the roller and largely relieves the actuating lever of the strain.

Each frame section includes a long gathering blade 20 which, because of its length is connected with the rear rail of the adjacent roller frame by a plurality of hinge arms 21, these being joined by a common beam 22. The arms are connected to eyebolts 23. A stirrup 24 provides a central place of connection for the link 25 of the lifting shaft 26 by which the blade is raised and lowered.

This shaft is supported by bearings 27, one of which is mounted upon a short forward extension of an end rail 28, the others being mounted on one rail of a stabilizing frame 29. This frame is composed of a pair of rails connected at the front by a U-iron 32. This iron has a hole 33 for the attachment of a clevis. The stabilizing frame extends sufficiently far forwardly to carry an extra or stabilizing roller 30. The combined function of the stabilizing rollers is to steady the implement to more than ordinary degree.

An equalizer bar 31 assists this function. This bar spans the distance between the forward extremities of the stablizier frames 29. The ends of the bar carry couplings 34 which include downwardly directed studs 35 to enter appropriate holes in the U-irons 32.

The seat 36 is supported upon a pair of angle or other bars 37 which extend from the forward place of connection upon the equalizer bar 31 to an attaching clip 38 beneath the yoke 39 at the rear. The ends of the yoke are rockably supported at 55 upon braces 40 extending both to the front and rear rails of the roller frames 3 and 4. Foot rests 42 connect the front ends of the bars 37.

A forward pull upon the handle 41 (Fig. 4) of the shaft 26 at either side of the operator turns the crank 43 and correspondingly pulls upon the link 25 to raise the blade 20 from the ground. Consonant with this action the beater 44 strikes upon the back of the blade thereby loosening and dislodging the gathered material.

The beater has a permanent pivotal connection at 45 with an upright 46 fixed upon the beam 22. A crank end 47 extending beyond the pivotal point connects with a reach rod 48 which is held at the forward end by a strap 49. The action is readily followed in Fig. 4 by comparing the operative dotted line position with the inoperative full line position.

In order to retain the frame sections 1 and 2 in proper longitudinal relationship use is made of a retainer (Fig. 5) consisting of bent arms 50 which extend toward each other and are embraced by a link 51 which must be fastened to one of the ends. The arrangement permits any necessary vertical movement between frame sections but prevents undesired longitudinal motion.

The crank 43 (Fig. 4) has a bend 52 in which the bolt or other stop 53 rests when the blade 20 is in operation (see dotted lines). A line drawn through the pivot 54 of the link 25 and the stop 53 falls below the center of shaft 26 so that ordinary jars upon the blade will not raise it from the ground. It is intended that the blade shall stay down.

The operation is readily understood. The left frame section 1 is supposed to be inoperative but the right section 2 is in operation. The driver is supposed to have reached down and pulled up on the handle 41 at his right.

The resulting action in the articulated connections shown in Fig. 4 raises the blade 20 and at the same time causes the beater 44 to strike the blade a sharp blow upon the back edge to dislodge the gathered material.

Meeting of ordinary obstructions by the blade 20 will not cause it to raise from the ground because the stop 53 (Fig. 4) would then bear down upon the bend 52 in the crank end 43 and stop the tendency toward motion. The relationship between the crank end and stop also keeps the handle 41 from falling back farther than the dotted position.

It is apparent that the two frame sections 1 and 2 are almost independent of each other. They are capable of independent vertical movement as is necessary when traversing usually uneven ground. At such time the braces 40 will rock at 55 in respect to the yoke 39, the equalizer bar 31 will also play freely at the studs 35 but the driver will remain in a generally upright position because of the suspension of his seat 36 between the parts named.

The yoke 39 and stabilizer 31 both serve as section connectors, and otherwise independent section movement is restrained by the retainer in Fig. 5. The arrangement of the bent arms 50 and link 51 prevents relative longitudinal movement but permits relative vertical movement.

By suspending the ground rollers 6 as shown in Fig. 3 most of the weight of the implement is imposed upon the rollers and the actuating lever 13 and various connections are spared unnecessary strains. Raising and lowering frame section adjustments of the actuating lever 13 are set by resetting the arms 14 in respect to the pins 11. The arms are slipped off sidewise and refitted upon the pins at other of the holes 16.

I claim:

1. An implement of the character described comprising a gathering blade, means to move the blade to a dumping position, and pivotally mounted means moved upon its pivotal mounting to beat upon the blade thereby to loosen the gathered material.

2. An implement of the character described comprising a gathering element including a blade, means to move said element to a dumping position, and pivotally mounted means operable by the foregoing means to strike said element in consonance with said dumping movement thereby to loosen the gathered material.

3. An implement of the character described comprising a gathering blade, means swingably mounting the blade, an actuating handle having connections for moving the blade upon its mounting into a dumping position, and a beater so joined to and operated by said connections as to then impart a blow to the blade to loosen the gathered material.

4. An implement of the character described comprising a gathering blade, a handle by which the blade is actuated, a link extending between the handle and blade, a crank actuated by the handle and to which the link is pivoted, a stop on the link, and a bend in the crank in which the stop rests in such manner as to prevent the blade riding up when striking an obstruction.

5. An implement of the character described comprising a gathering blade, means swingably mounting the blade, an actuating handle having connections for moving the blade upon its mounting into a dumping position, a beater, means moving with the blade to the dumping position and pivotally carrying said beater, and a reach rod retained at one end and so connected with the beater at the opposite end as to rock the beater to strike the blade upon moving the blade to the dumping position.

6. An implement of the character described comprising a swinging gathering blade, a beater having a crank end, means moving with the beater pivotally carrying the beater, and a connection joining the crank end to independently rock the beater as the blade is swung.

MORGAN D. KAST.